United States Patent [19]

D'Angelo

[11] 4,142,032

[45] Feb. 27, 1979

[54] PROCESS FOR IMPROVING BARRIER PROPERTIES OF POLYMERS

[75] Inventor: Paul F. D'Angelo, Monroe, N.Y.

[73] Assignee: Union Carbide Corporation, New York, N.Y.

[21] Appl. No.: 865,601

[22] Filed: Dec. 29, 1977

[51] Int. Cl.² .......................... C08F 8/20; C08F 8/22
[52] U.S. Cl. ...................................... 526/43; 526/21; 526/22; 526/42; 526/44
[58] Field of Search .................... 526/44, 43, 42

[56] References Cited

U.S. PATENT DOCUMENTS

| | | | |
|---|---|---|---|
| 3,647,613 | 3/1972 | Scotland | 526/44 |
| 3,862,284 | 1/1975 | Dixon et al. | 264/83 |

*Primary Examiner*—William F. Hamrock
*Attorney, Agent, or Firm*—William Raymond Moran

[57] ABSTRACT

A process is provided for achieving significant improvements in the barrier properties of polymeric articles, such as films and containers, by surface treatment with both fluorine and bromine. The process is conducted at moderate temperatures, short treatment times and near one atmosphere pressure.

11 Claims, No Drawings

PROCESS FOR IMPROVING BARRIER PROPERTIES OF POLYMERS

This invention relates, in general, to a process for improving barrier properties of polymers. In one aspect, this invention is directed to a process for improving barrier properties of polymeric articles, such as films, and containers. In a further aspect, the invention, is directed to a process for achieving significant improvement in barrier properties by the fluorobromination of polymeric articles.

Prior to the present invention it was known to treat olefinic and styrene-containing polymers with reactive halogen mixtures to alter one or more properties and/or to incorporate the halogens into the olefinic or styrene-containing polymers to generate a new polymer. Such mixtures in which one of the halogens is fluorine and the other bromine have been utilized to treat olefinic and styrene-containing polymers. For example, U.S. Pat. 3,862,284 which issued Jan. 21, 1975 to Dale D. Dixon et al discloses a process for improving barrier properties of blow molded, thermoplastic-articles. A fluid medium which, if a proper choice is made from the several compositions and elements disclosed, may consist of fluorine and bromine and can be used in the blow molding process to conform the thermoplastic polymer to the contour of a mold. However, the process disclosed in the Dixon et al patent differs from the present invention in two important ways: treatments of olefinic and styrene-containing polymers are performed at or above the softening point of the polymer and at a pressure greater than one atmosphere.

It is clear that the entire aim of the teachings of the Dixon patent is toward an almost mechanical process improvement. That is, the patentees try to combine blow molding with gas treatment, probably in order to minimize investment and process hardware. Thus, Dixon is entirely concerned with treatments on molten polymers at the high temperatures used in blow molding. It appears that the $F_2/Br_2$ treatment was employed at those high temperatures, with the expectation that bromine incorporation could occur, and that, as is well known, bromine incorporation would reduce flammability.

Several other patents have issued which disclose the use of fluorine and bromine. For instance, U.S. Pat. Nos. 2,774,797; 2,670,389; 2,684,987; and 2,786,874 all disclose such a combination. However, in each instance the treatments are performed on carbon, not on olefinic or styrene-containing polymers and usually at high temperatures. Improved barrier properties are not disclosed or even suggested.

Other prior art references, such as British Pat. Nos. 834,905; 950,374; Canadian Pat. No. 852,287; and U.S. Pat. No. 2,913,449 require that the olefinic polymer be treated in a finely divided free flowing form, or more concisely a powdered form. None of these patents discloses improved barrier properties.

It is also well known that fluorine and bromine can be combined under some conditions to make bromine fluorides and consequently bromine fluorides may be thought to be the species imparting improved barrier properties. That bromine fluorides are not responsible for the excellent barriers generated by the present invention is shown by the following patents which teach bromine fluorides to be only fluorinating (not brominating) agents except in the presence of unsaturation. Also, saturated organic compounds treated with bromine trifluoride even in bromine solvent are shown to be exclusively fluorinated. Such patents include British Pat. No. 1,059,234 and U.S. Pat. Nos. 3,651,155; 3,775,489; and 2,489,969.

Accordingly, one or more of the following objects can be achieved by the practice of the present invention. It is an object of this invention to provide a process for achieving significant improvements in barrier properties of olefinic and styrene-containing polymeric films and containers. Another object of the invention is to provide improved adhesive properties of the surface of the treated polymeric film and containers. Still another object is to provide increased photodegradation of the polymeric film and containers. Yet still a further object is to treat only a surface layer of the polymeric film and containers. A further object of the invention is to provide a process of accelerated halogenation of polyolefin polymers. A still further object is to provide a process for the surface treatment of films and containers with both fluorine and bromine. These and other objects will readily become apparent to those skilled in the art in the light of the teachings herein set forth.

In its broad aspect, the present invention is directed to a process for improving barrier properties of polymers. The process comprises contacting at least one polymeric article with fluorine and a bromine source wherein:

(a) the ratio in volume percent of fluorine to the bromine source is from about 0.1 to 1, to about 100 to 1,
(b) the pressure does not substantially exceed about one atmosphere,
(c) the temperature is from about 0° C. up to about the melting point of the polymer, and
(d) the treatment time is from about 1 minute or less, 30 minutes, and thereafter recovering the article having improved barrier properties.

In practice, the present invention is therefore a process in which mixtures of fluorine with a reactive bromine source such as molecular bromine, trifluorobromomethane or other comparable agent (e.g. BrCl) can be used to surface treat olefinic and styrene-containing polymeric films and containers to give improved barrier properties. Barriers to gases such as oxygen and carbon dioxide and liquids such as xylene are generated.

Specifically the ratio in volume percent of fluorine to the bromine source is 0.1/1 to 100/1; the pressure, at or near one atmosphere; the temperature, from 20°-80° C.; and treatment times of 1-30 minutes. The preferred treatment conditions are a fluorine to bromine source ratio in volume percent of 1/1 to 10/1, a pressure of one atmosphere, a temperature regime of 20°-65° C., and treatment times of 1-10 minutes. Of course, in a gas phase process, volume percent (equivalent to mole percent) is the most convenient method of expressing proportions.

Bromine sources appropriate for the present invention included bromine, trifluorobromomethane or other saturated halocarbons containing replaceable bromine atoms, bromine chloride, and bromine iodide.

It has been observed that the polymers given improved barrier properties by the above treatments are olefinic and styrene-containing polymers. Specifically, they are thermoplastics selected from the group consisting of polystyrene, poly-alpha methyl styrene and their copolymer, e.g. styrene-butadiene copolymers, and polyolefins of at least one aliphatic mono-1-olefin having a maximum of about eight carbons and their copolymers, e.g. ethylene-propylene and ethylene-vinyl acetate copolymers. The preferred themo plastic polymers usually contain one of the following monomers: ethylene, propylene, 1-butene, 1-pentene, 4-methyl-1-pentene, 3-methyl-1-butene, and 3,3 dimethyl-1-butene.

The treated polymeric film and container of the above resins can also contain additives commonly employed by those skilled in the art to improve chemical and physical properties of the fabricated article. They include pigments, antioxidants, etc. Also, the polymers treated by the present invention can be part of blends with other polymers disclosed in the present invention and with other polymers not specifically disclosed in the present invention, for example, saran, nylon-6 and the like.

The above mentioned treatment parameters are critical to the invention and the improved barrier properties obtained from these treatments are very surprising and unexpected. However, one may argue that fluorobrominations are simply an extension of fluorochlorinations. For instance, if fluorobrominations were simply an extension of fluorochlorinations, then the latter treatments should also significantly improve barrier properties. Though no prior art has been found which relates to improved barrier properties for fluorochlorinations, it has been observed, that fluorine/chlorine treatments on olefinic and styrene-containing polymers at comparable treatment conditions do not even nearly match the improved barrier properties of fluorobrominations. Fluorine/chlorine treatments are also less reactive than fluorobrominations in terms of weight gains and depth of penetration of treatment into the surface of the treated polymer. Table I indicates the better barrier properties and higher reactivity of fluorine/bromine treatments compared to fluorine/chlorine treatments.

sion of the experiment by a nitrogen other inert diluent purge into a scrubber.

In the vacuum fill method, the reactor was evacuated to one torr or less and fluorine and bromine or another bromine source were distilled or flowed into the reactor either simultaneously or sequentially until the desired amounts of each compound was added. Nitrogen or other inert diluent could be allowed to enter to set the final pressure. At the conclusion of the experiment, the reactive gases could be either pumped out by means of a suitable vacuum pump into a scrubber or purged out with nitrogen gas or other inert diluent into a scrubber.

The treatment system consists of a gas manifold, a reactor, and a scrubber. The gas manifold consists of metal tubing, flowmeters, and valves. The purpose of the manifold is to bring into the reactor in a safe and controlled manner reactive and inert gases. The metal tubing is one quarter inch (O.D.) and of copper or stainless steel construction. The flowmeters are the Matheson Series 620 and tubes 600–605. Two and three way stainless steel valves are used to start, stop, and control direction of the gas flow.

The reactor is a rectangular box with an interior volume of 21 liters and of mild steel construction. The interior is provided with steel racks for placement of films and containers. The reactor is bolted at both ends and for each end the bolts hold in place a neoprene gasket and on top of the gasket a steel plate. The gasket provides a vacuum tight seal. A stainless steel port is provided in each steel plate to allow gases to flow into and out of the reactor. The reactor is heated by a heating mantle which covers the exterior of the reactor. A fritted gas dispersion tube is connected from inside the reactor and goes through the inlet side steel port so that gases entering the reactor from the gas manifold will be dispersed prior to treatment of films and containers.

TABLE I

| Polyethylene Film | Gas Mixture | Time (Minutes) | Temperature (degrees C) | Weight Gain % | Oxygen[2] Permeability |
|---|---|---|---|---|---|
| 1. Control DMDJ-5140[1] | | | | | 145 ± 29 |
| 2. DMDJ-5140 | 25%$F_2$/75%$Cl_2$ | 7.5 | 63 | 10.9 | 59 ± 12 |
| 3. DMDJ-5140 | 33%$F_2$/14%$Br_2$/$N_2$ | 5 | 60 | 14.4 | 9.9 ± 2 |

[1]DMDJ-5140 is a high density polyethylene homopolymer of density, 0.962 g/cc melt index, 0.8; and thickness, 1.4 mils.
[2]Units: cc-mils/100 in$^2$-24 hrs-1 atm [zero percent relative humidity (RH), room temperature (RT)] (scater in permeability data is generally in the range of 10–20 percent. Outer limit of range (20 percent) is indicated here.)

The process of this invention can be performed in any suitable reactor that can handle reactive and corrosive materials such as fluorine and bromine. It is preferred to utilize stainless steel reactors, the interior of which have been passivated by fluorine as is known in the art. Treatment methods included a flow-through type and a vacuum-fill type.

In the flow-through procedures, the reactor containing the films and/or containers to be treated was purged with nitrogen or other inert gas (e.g. helium) to remove oxygen and then fluorine and bromine (or another bromine source) were flowed into the reactor, treated the film and containers, and left the reactor by flowing out into a scrubber to render inert the reactive compounds. Fluorine and bromine (or other bromine source) could enter the reactor either simultaneously or sequentially. The volume percent fluorine was determined by use of suitable flowmeters and the volume percent of bromine by its vapor pressure at a given temperature. Bromine was carried into the reactor by nitrogen or other suitable gas which flowed through bromine-containing saturators. Reactive gases were purged at the conclu- The outlet side stainless steel port is connected to one quarter inch stainless or copper tubing and valves which allow the existing gases to enter the scrubber. The interior of the reactor was passivated with fluorine gas prior to any treatment of films and containers.

The purpose of the scrubber is to render inert any reactive gases. The scrubbing solution is 40% potassium hydroxide in water. The scrubbing solution is kept in a five gallon steel drum. Reactive gases may enter the scrubber directly from the outlet side of the reactor or from a vacuum pump which can be used to very rapidly remove gases from the reactor and pump them into the scrubber.

In the following examples, testing for gas permeation rates was carried out by a method described by Brubaker and Kammermeryer in Anal. Chem., 25, 424–426, 1953, with the modifications set forth below. The principle used was identical to the one cited in the article, that is, measuring the permeated gas rate at conditions of constant temperature and pressure, by displacing a liquid in a capillary column. The exit end of the capillary column opens into laboratory ambient conditions.

The entrance end of the liquid filled capillary is connected to the low pressure (permeate) side of a supported membrane or film. On the other side of the membrane, a high pressure of gas, typically 100 psig, ranging from 40 to 200 psig, is applied from a suitable source such as a pressurized gas cylinder and gas pressure regulator. Under these circumstances, gas permeates through the membrane or film and displaces liquid in the capillary tube. A calibrated pipette — volume chosen to match the flow rate — is used as the capillary, and the time rate of liquid volume displacement in the capillary is taken as the gas permeation rate. The formula in Brubaker and Kammermeyer is used to convert permeation rate to permeability constant. Because generally large changes in permeation rate are caused by the process of this invention, the very small percentage corrections for different barometric pressures and different room temperatures on different days were neglected.

The modifications of the reference process included the use of colored toluene in place of mercury as the liquid in the capillary tube. Additionally, in place of a vibrator, the capillary tube was tapped manually. A circular test area of 25.6 square centimeters was used and the film supported on sintered stainless steel. No screen or porous disk was put on the high pressure side of the film. Also the seal between the high pressure side of the permeation testing cell and the membrane was made by an O-Ring instead of a gasket. A short length of thick walled rubber tube connected the outlet of the low pressure side of the cell to the capillary tube.

Liquid permeation rates were typically measured by following the weight loss of a tightly capped container over a period of time.

The following examples are illustrative:

EXAMPLE 1

This example illustrates the sequence of steps for a specific treatment using a flow through type method. The steps of the treatment were as follows:

1. Low density polyethylene film (density = 0.917g/cc, melt index = 0.1, thickness = 1.3 mils) and high density polyethylene film (density = 0.962g/cc, melt index = 0.8, thickness = 1.4 mils) were placed on steel racks inside the reactor. The outlet side steel plate was bolted to the reactor and connected to the scrubber. The reactor was at a temperature of 60° C.
2. The air in the reactor was substantially replaced with nitrogen by flowing nitrogen gas through the reactor for 15 minutes at 4 liters/minute.
3. The nitrogen flow was reduced to 0.64 liters/minute and was redirected to flow sequentially into two saturators containing molecular bromine with the second saturator heated to 30° C. After exiting the heated saturator the nitrogen, now saturated with bromine, entered the reactor.
4. The bromine ($Br_2$)/nitrogen ($N_2$) flow continued for 5 minutes without fluorine introduction.
5. Then fluorine ($F_2$) gas obtained from a fluorine gas cylinder entered the reactor from the gas manifold and was gradually brought to a flow rate of 0.2 liters/min over one minute. The fluorine gas continued to flow for an additional 5 minutes into the reactor along with the $Br_2/N_2$ mixture. The flows of $F_2$ and $Br_2/N_2$ generated in the reactor in volume percent: $\%F_2$ = 20, $\%Br_2$ + 17.

The extimated values for percent $F_2$ and $Br_2$ are considered to be reasonably accurate, probably within 30% of their true values because fluorine that flows into the reactor is not observed to flow out of the reactor to any great extent. That is, very little bubbling in the liquid caustic scrubber of $F_2$ gas is observed when $F_2$ is flowed into the reactor which contains the $Br_2/N_2$ mixture and is connected to the liquid caustic scrubber. Apparently $F_2$ upon entering the reactor reacts nearly completely with either or both the polymeric articles and bromine.

Since $F_2$ is not barely observed flowing out of the reactor, the there is no gas to remove the bromine and $N_2$ from the reactor; consequently, the $\% Br_2$ and $\% N_2$ values are also expected to be at least as accurate as the $\% F_2$ value.

6. Then both $F_2$ and $Br_2/N_2$ flows were stopped and the $N_2$ flow was redirected to enter the reactor alone and purge the reactor of reactive gases. Purging conditions were 15 minutes at $N_2$ flow of 4 liters/minute.
7. The outlet side steel plate was unbolted and the treated films were removed.

The gas barriers generated in the above treatment are listed in Table II below:

TABLE II

| Polyethylene Film | $\%F_2/Br_2$[4] | $F_2$ Exposure Time (Minutes) | Temperature (degrees C) | % | Weight Gain MIcrograms Sq. Centimeter | Oxygen[1] Permeability | Carbon[1] Dioxide Permeability |
|---|---|---|---|---|---|---|---|
| 1. LDPE[2] (Control) | | | | | | 904 ± 180 | 3781 ± 756 |
| 2. LDPE | 20/17 | 5 | 60 | 28 | 442 | 75 ± 15 | 574 ± 115 |
| 3. DMDJ-5140[3] (Control) | | | | | | 146 ± 29 | 690 ± 138 |
| 4. DMDJ-5140 | 20/17 | 5 | 60 | 11 | 158 | 12 ± 2 | 85 ± 17 |

[1]Units: cc-mil/100 in.[2] - 24 hrs. - 1 atm. (zero percent RH, RT) scatter in permeability data estimated 207
[2]This is an uncompounded, low density polyethylene feedstock (thickness, 1.3 mil; density, 0.915g/cc; melt index, 0.1).
[3]DMDJ-5140 is a high density, polyethylene homopolymer (density, 0.962g/cc; melt index, 0.8; thickness, 1.4 mil).
[4]Remainder of mixture was $N_2$ diluent.

EXAMPLE 2

The fluorine/bromine treatment in Example 1 was repeated on the low and high density polyethylene film described therein except the fluorine exposure time in the reactor with the $Br_2/N_2$ mixture was 30 minutes. Table III lists the excellent gas barrier properties for the treated films.

TABLE III

| Polyethylene Film | %$F_2$/$Br_2$[4] | $F_2$ Exposure Time (Minutes) | Temperature (degrees C) | % | Weight Gain Micrograms Sq. Centimeter | Oxygen[1] Permeability | Carbon[1] Dioxide Permeability |
|---|---|---|---|---|---|---|---|
| 1. LDPE[2] (Control) | | | | | | 904 ± 180 | 3781 ± 756 |
| 2. LDPE | 20/17 | 30 | 60 | 93 | 1457 | 18 ± 4 | 163 ± 33 |
| 3. DMDJ-5140[3] (Control) | | | | | 146 ± 29 | 690 ± 138 | |
| 4. DMDJ-5140 | 20/17 | 30 | 60 | 29 | 414 | 3.2 ± 0.6 | 19 ± 4 |

[1]Units: cc-mil/100 in.$^2$ - 24 hrs. - 1 atm.,(zero percent RH, RT)scatter in permeability data estimated 20%.
[2]This is an uncompounded, low density polyethylene feedstock (thickness, 1.3 mils; density, 0.915g/cc; melt index, 0.1).
[3]DMDJ-5140 is a high density, polyethylene homopolymer (density, 0.962g/cc; melt index, 0.8; thickness, 1.4 mils).
[4]Remainder of mixture was $N_2$ diluent.

EXAMPLE 3

The fluorine/bromine treatment in Example 1 was repeated except the nitrogen flow rate into the saturators containing bromine was 0.81 liters/minute and the fluorine flow rate was 0.91 liters/minute. The volume percent fluorine and bromine in the reactor was determined to be 46.5 and 11.3 percent respectively. The samples treated were 250-cc, linear high density polyethylene bottles. The improved xylene barrier properties of a treated bottle compared to an untreated one is indicated in Table IV.

TABLE IV

| Bottle | %$F_2$/$Br_2$[3] | $F_2$ Exposure Time (Minutes) | Temperature (degrees C) | % | Weight Gain Micrograms Sq. Centimeter | Percent Xylene Lost After 4 months |
|---|---|---|---|---|---|---|
| Control[1] | | | | | | 40 |
| Treated | 46.3/11.3 | 5 | 61 | 2.4 | 1332 | 17 |

[1]Bottles are 250-cc, linear, high density polyethylene bottles purchased from Nalgene Company.
[2]Based on initial weight of xylene only.
[3]Remainder of mixture was $N_2$ diluent.

EXAMPLE 4

The fluorine/bromine treatment in Example 1 was repeated except for the following differences:
1. The nitrogen flow rate in the bromine saturators was 0.81 liters/minute.
2. The $N_2$/$Br_2$ flow into the reactor was for a total time of twenty minutes and was completed before fluorine entered.
3. The fluorine flow rate was 1.4 liters/minute.
4. The samples treated were 4 oz., 80 mil wall, high density polyethlene containers of density 0.953, and of melt index 0.3. The bottles were made by an injection-blowing molding process and the openings of these bottles were molded to take one inch caps used for metal aerosol cans. The bottles were fitted with standard one inch aerosol caps which had been modified. The modification consisted of welding one-quarter inch (O.D.) stainless steel tubing was then connected to a three way pressure valve and pressure gauge. The bottles were evacuated to about one torr and quickly filled to 60 psig with the gas to be tested.

This treatment of Example 4 had approximately the following concentrations of F and Br in volume percent: $F_2$, 42%; $Br_2$, 13%.

The improved gas barrier properties of the treated containers over untreated containers are indicated in Table V.

TABLE V

| Bottle | %$F_2$/$Br_2$[3] | $F_2$ Exposure Time (Minutes) | Temperature (degrees C) | % | Weight Gain Micrograms Sq. Centimeter | Percent $O_2$ Pressure Lost (3 weeks)[2] | Percent $CO_2$ Pressure Lost (3 weeks)[2] |
|---|---|---|---|---|---|---|---|
| Control[1] | | | | | | 42 | |
| Treated | 42/13 | 5 | 58 | 0.5 | 595 | 5 | |
| Control | | | | | | | 75 |
| Treated | 42/13 | 5 | 58 | 0.5 | 603 | | 23 |

[1]Bottles are injection-blow molded bottles (thickness, 80 mil; density, 0.953; melt index, 0.3; interior volume, 4 oz.)
[2]Bottles were set at an initial pressure of 60 psig.
[3]Remainder of mixture was $N_2$ diluent.

EXAMPLE 5

Samples of low and high density polyethylene films of the type described in Example 1 are placed in the reactor and the reactor is bolted to give a vacuum tight seal. The reactor is evacuated to one torr and then gaseous bromine chloride (boiling point = 5° C.) is allowed into the reactor to a concentration in volume percent of 15. Fluorine is allowed in over one minute to a concentration in volume percent of 60. The $F_2$/BrCl mixture treats the films for an additional five minutes with the reactor at 60° C. The total pressure is 0.75 atmosphere. The reactor is then evacuated by use of a vacuum pump which pumps the gases into a scrubber which transforms the reactive gases into inert materials. This treatment gives barrier properties analogous to those in Example 1.

EXAMPLE 6

High density polyethylene film (density, 0.962 g/cc; melt index, 0.8 thickness, 1.4 mils) was placed in the reactor and the reactor was bolted to give a vacuum tight seal. The reactor was evacuated to 1 torr and trifluorobromomethane ($CF_3Br$) was allowed to enter to a concentration in volume percent of 75. $N_2$ was then allowed to enter to give a total pressure of one atmosphere. Fluorine was flowed into the reactor at a flow rate of 0.7 liters/minute and for a total time of 5 minutes. The fluorine flow was then stopped and the reactor was purged with nitrogen gas. The reactor temperature for this treatment was 58° C.

The following estimated concentrations in volume percent of fluorine and trifluorobromomethane in the reactor were as follows: $F_2$, 15%; $CF_3Br$, 75%.

The improved barrier properties of the treated film are indicated in Table VI.

4. Reactor temperature was 58° C.

The above treatment was repeated again except steps in which $Br_2$ was brought into the reactor were eliminated. Hence the second treatment was a fluorine treatment performed in an identical manner as the fluorine/bromine treatment above.

A comparison of reactivity and amount of fluorine incorporation for the two treatments showed that the presence of bromine accelerated the rate of fluorine incorporation over that in which no bromine was pres-

TABLE VI

| Polyethylene Film | %$F_2$/$CF_3Br$[3] | $F_2$ Exposure Time (Minutes) | Temperature (degrees C) | % | Weight Gain Micrograms Sq. Centimeter | Oxygen[2] Permeability |
|---|---|---|---|---|---|---|
| DMDJ-5140[1] (Control) | | | | | | 146 ± 29 |
| DMDJ-5140 | 15/75 | 5 | 58 | 5.2 | 124 | 88 ± 18 |

[1]DMDJ-5140 is a high density polyethylene homopolymer (density, 0.962 g/cc; melt index, 0.8; thickness, 2.4 mils).
[2]Units: cc-mil/100 in.[2] -14 24 hrs. - 1 atm. (zero percent RH, RT) scatter in permeability data estimated to be 20%.
[3]Remainder of mixture was $N_2$ diluent.

EXAMPLE 7

Samples of high density polyethylene films of the type described in Example 1 were placed in the reactor and the reactor was bolted to give a vacuum tight seal. The reactor was evacuated to one torr and then gaseous bromine pentafluoride ($BrF_5$) was allowed to enter the reactor to give a concentration in volume percent of 26. Nitrogen gas was allowed to enter to bring pressure to one atmosphere. The film samples were exposed to bromine pentafluoride for 15 minutes at a reactor temperature of 60° C. The reactor was then purged with nitrogen gas at the end of the treatment. Table VII indicates that this treatment with $BrF_5$ did not generate the excellent gas barriers obtained from $F_2$/$Br_2$ treatments even though the $BrF_5$ exposure time was factor of three longer compared to the $F_2$/$Br_2$ treatment.

ent. Table VIII indicates this novel and unobvious effect of the presence of bromine.

TABLE VIII

| Polyethylene Film | Gas Concentration[1] | Gas Exposure Time (Minutes) | Temperature (degrees C) | Weight Gain of Fluorine % | Weight Gain of Bromine % |
|---|---|---|---|---|---|
| DMDJ-5140 | 30% $F_2$/15% $Br_2$ | 5 | 58 | 7.9 | 5.24 |
| DMDJ-5140 | 30% $F_2$ | 5 | 58 | 1.6 | |

[1]$F_2$ and $Br_2$ concentrations were estimated. Remainder of mixture was $N_2$ diluent.

EXAMPLE 9

This example illustrates the sequence of steps for a specific treatment using the vacuum fill method.

1. Low density polyethylene film (density = 0.917 g/cc, melt index = 0.1, thickness = 1.3 mils) and high density polyehtylene film (density = 0.962 g/cc, melt index = 0.8, thickness = 1.4 mils) were placed on steel racks inside the reactor. The outlet side steel plate was bolted to the reactor and connected to a vacuum pump filled with a halocarbon oil. The vacuum pump was purchased from Alcatel Vacuum Products; the model number was ZM-2004-H. The halocarbon oil was coded as number 14-25 and was purchased from Halocarbon Corpo-

TABLE VII

| Polyethylene Film | Gas[1] Concentration | Gas Exposure Time (Minutes) | Temperature (degrees C) | % | Weight Gain Micrograms Sq. Centimeter | Oxygen[2] Permeability |
|---|---|---|---|---|---|---|
| DMDJ-5140[3] (Control) | | | | | | 146 ± 29 |
| DMDJ-5140 | 33%$F_2$/14% $Br_2$ | 5 | 65 | 14.4 | 225 | 9.6 ± 2 |
| DMDJ-5140 | 26% $BrF_5$ | 15 | 60 | 4.4 | | 85 ± 17 |

[1]Remainder of gas volume was $N_2$ diluent.
[2]Units: cc-mil/100 in.[2] - 24 hrs. - 1 atm. (zero percent RH, RT) scatter in permeability data estimated to be 20%.
[3]DMDJ-5140 is a high density polyethylene homopolymer (density, 0.962 g/cc; melt index, 0.8; thickness, 1.4 mil).

EXAMPLE 8

The fluorine/bromine treatment in Example 1 was repeated except for the following differences:
1. The $Br_2$/$N_2$ flow into the reactor was for a total time of twenty minutes and was completed before $F_2$ entered.
2. Fluorine flow rate was 1.4 liters/minute.
3. Only the high density polyethylene films described in Example 1 were treated.

ration. A three way valve in the line between the reactor and pump could be directed to allow exiting gases from the reactor to by-pass the vacuum pump and enter directly into a caustic scrubber. The outlet port of the cauum pump had one end of a stainless steel tube (O.D. = ¾″) connect to it and the other end was immersed in a caustic scrubber (40% potassium hydroxide in water). The reactor was at a temperature of 60° C.

2. The reactor was evacuated by the bacuum pump to less than 0.01 atmosphere. The reactor was opened to two bromine containing saturators in sequence which had nitrogen gas flowing through them at approximately 1.5 liters/minute. A pressure gauge which could withstand reactive gases was monitored to set the total pressure of the $Br_2/N_2$ mixture entering the reactor to 0.7 atmospheres, approximately 70% of the total volume of reactor. The $N_2$ flow through the saturators was then stopped. The reactor was closed off to the $Br_2$ saturators. Fluorine gas from a $F_2$ gas cylinder was then flowed into the reactor at a flow rate near 3 liters/minute until the pressure gauge indicated one atmosphere pressure in the reactor and then the $F_2$ flow was stopped. The total exposure time of $F_2$ gas in the reactor was 5 minutes. Then $N_2$ gas was flowed through the reactor at 6 liters/minute and carried reactive gases into the caustic scrubber. The total purge time was 15 minutes. Estimated concentrations of $F_2$ and $Br_2$ in the reactor were % $F_2$ = 30 and % $Br_2$ = 14.

3. The outlet side steel plate was unbolted and the treated films were removed. These films had melted or burned to such a degree that their gas barrier properties could not be measured.

The fluorine/bromine treatment in Example 9 was repeated except the $Br_2/N_2$ mixture filled the reactor to a pressure of one atmosphere instead of 0.7 atmospheres and F gas was flowed into the $Br_2/N_2$ filled reactor at 3 liters/minute for a total fluorine exposure time of 3 minutes. The reactor was purged with N gas for 15 minutes at a $N_2$ flow of 8 liters/minute. The estimated concentrations of $F_2$ and $Br_2$ in the reactor were % $F_2$ = 43, % $Br_2$ = 14. Table IX lists the excellent gas barrier properties for the treated high density polyethylene films. The $F_2/Br_2/N_2$ treatment melted the low density polyethylene films.

the invention incompasses the generic area as hereinbefore disclosed. Changes thereto can be made without departing from the spirit and scope thereof.

What is claimed is:

1. A process for improving the barrier properties of at least one olefinic or styrene-containing polymer which comprises contacting said polymer with fluorine and a bromine source wherein:
    (a) the ratio in volume percent of fluorine to said bromine source is from about 0.1 to 1, to about 100 to 1,
    (b) the pressure does not substantially exceed about one atmosphere,
    (c) the temperature is from about 0° C. up to about the melting point of said polymer article, and
    (d) the treatment time is from about 1 minute or less to about 30 minutes, and thereafter recovering said article having improved barrier properties.

2. The process of claim 1 wherein said bromine source is molecular bromine.

3. The process of claim 1 wherein said bromine source is trifluorobromomethane.

4. The process of claim 1 wherein said bromine source is bromine chloride.

5. The process of claim 1 wherein said bromine source is bromine iodide.

6. The process of claim 1 wherein said fluorine to bromine source ratio in volume percent is from about 1 to 1, to about 10 to 1.

7. The process of claim 1 wherein said temperature is from about 20° to about 65° C.

8. The process of claim 1 wherein said treatment time is from about 1 to about 10 minutes.

9. The process of claim 1 wherein said polymer is in the form of a film.

10. The process of claim 1 wherein said polymer is in the form of a container.

11. The process of claim 10 wherein said container is an aerosol bottle.

TABLE IX

| Polyethylene Film | % $F_2/Br_2$[2] | $F_2$ Exposure Time (Minutes) | Temperature (Degrees C) | % | Weight Gain Micrograms Sq. Centimeters | Oxygen Permeability | Carbon Dioxide Permeability |
|---|---|---|---|---|---|---|---|
| DMDJ-5140 (Control)[3] | | | | | | 146 ± 29 | 690 ± 138 |
| DMDJ-5140 | 43/14 | 3 | 65 | 10.3 | 256 | 9.2 ± 2 | 91 ± 18 |

[1]Units: cc-mils/100 in [2] -24 hrs. - 1 atm. (zero percent RH, RT). Scatter in permeability data was estimated to be 20%.
[2]Remainder of mixture was $N_2$ diluent.
[3]DMDJ-5140 is a high density polyethylene homopolymer (density = 0.962 g/cc; melt index, 0.8; 1.4 mils).

Although the invention has been illustrated by the preceding Examples, it is not to be construed as being limited to the processes employed therein, but rather,

* * * * *

UNITED STATES PATENT OFFICE
CERTIFICATE OF CORRECTION

Patent No. 4,142,032　　　　　　　　Dated February 27, 1979

Inventor(s)　P. F. D'Angelo

It is certified that error appears in the above-identified patent and that said Letters Patent are hereby corrected as shown below:

In claim 1, paragraph (c), line 2;

delete "article".

In claim 1, paragraph (d), line 3;

"article" should read "polymer".

*Signed and Sealed this*

*Third* Day of *July 1979*

[SEAL]

*Attest:*

LUTRELLE F. PARKER
*Attesting Officer*　　*Acting Commissioner of Patents and Trademarks*